(12) United States Patent
Ferlitsch (10) Patent No.: US 7,339,696 B2
(45) Date of Patent: Mar. 4, 2008

(54) SYSTEMS AND METHODS FOR DYNAMICALLY GENERATING A PRINTER MODEL DATABASE

(75) Inventor: Andrew R. Ferlitsch, Tigard, OR (US)

(73) Assignee: Sharp Laboratories of America, Inc., Camus, WA (US)

( * ) Notice: Subject to any disclaimer, the term of this patent is extended or adjusted under 35 U.S.C. 154(b) by 973 days.

(21) Appl. No.: 10/647,564

(22) Filed: Aug. 25, 2003

(65) Prior Publication Data

US 2004/0190033 A1    Sep. 30, 2004

Related U.S. Application Data

(63) Continuation-in-part of application No. 10/397,014, filed on Mar. 25, 2003.

(51) Int. Cl.
*G06F 15/00* (2006.01)

(52) U.S. Cl. .................. 358/1.16; 358/1.15; 358/1.2; 358/504; 358/1.9; 707/10

(58) Field of Classification Search .......... 358/1.16, 358/1.15, 2.1; 707/10
See application file for complete search history.

(56) References Cited

U.S. PATENT DOCUMENTS

| 5,935,262 | A | * | 8/1999 | Barrett et al. ............ 714/46 |
| 6,266,150 | B1 | | 7/2001 | Brossman et al. ......... 358/1.15 |
| 6,763,482 | B2 | * | 7/2004 | Bernklau-halvor ........... 714/25 |
| 7,102,765 | B1 | * | 9/2006 | Abi-Saleh et al. ......... 358/1.13 |
| 7,133,141 | B1 | * | 11/2006 | Abi-Saleh .................. 358/1.13 |
| 7,139,097 | B2 | * | 11/2006 | Wu et al. .................... 358/1.9 |
| 2002/0116439 | A1 | | 8/2002 | Someshwar et al. ........ 709/104 |
| 2002/0138557 | A1 | | 9/2002 | Mukaiyama et al. ....... 709/203 |
| 2003/0011805 | A1 | | 1/2003 | Yacoub .................... 358/1.15 |
| 2003/0011819 | A1 | * | 1/2003 | Toda ........................ 358/1.15 |
| 2003/0081274 | A1 | * | 5/2003 | Yamamoto .................. 358/504 |
| 2003/0120624 | A1 | * | 6/2003 | Poppenga et al. ............. 707/1 |
| 2004/0019495 | A1 | * | 1/2004 | Fukano .......................... 705/1 |

FOREIGN PATENT DOCUMENTS

JP        2002132481        5/2002

\* cited by examiner

*Primary Examiner*—Twyler Lamb Haskins
*Assistant Examiner*—Mark R. Milia
(74) *Attorney, Agent, or Firm*—Michael F. Krieger; Kirton & McConkie (57) ABSTRACT

Systems and methods for dynamically generating a printer model database (PMDB) that is based on a printer driver. The printer model database is dynamically generated by automatically generating device independent print job options, semi-automatically generating device dependent print job options, and automatically generating a printer model database.

24 Claims, 9 Drawing Sheets

SYSTEMS AND METHODS FOR DYNAMICALLY GENERATING A PRINTER MODEL DATABASE

RELATED APPLICATIONS

This application is a continuation-in-part of U.S. patent application Ser. No. 10/397,014 filed Mar. 25, 2003, entitled USER DEFINABLE PRINT OPTION CONVERSION FOR HETEROGENEOUS CLUSTER PRINTING, which is incorporated herein by reference.

BACKGROUND OF THE INVENTION

1. Field of the Invention

The present invention relates to electronic imaging environments. In particular, the present invention relates to systems and methods for dynamically generating a printer model database (PMDB) that is based on a printer driver, wherein the printer model database includes information about a printer model. Utilization of the printer model database enables a variety of processes to occur, including causing a print job to be compatible with a printing device when the print job is rerouted in a pool printing environment.

2. Background and Related Art

A printer model database (PMDB) is a database that includes information about one or more printer models. For each printer model, the database typically includes information such as (i) associated printer drivers, (ii) base capabilities, (iii) installable capabilities, and (iv) print job control commands associated with the capabilities.

Current techniques for creating a PMDB include creating the PMDB by hand. For example, a user creates a PMDB for a specific printer model by referencing the manufacturer's specification for the printer model. While this technique is currently available, a variety of problems currently exist. For example, the manufacturer's specification may not be available, all the information needed to create the PMDB (e.g., PJL statement sequence) may not necessarily be in the manufacturer's specification, interpretation of the manufacturer's specification is prone to human error, manual entry into the PMDB is prone to human error, and/or the manual task has proven to be laborious.

Alternatively, the capabilities and associated print job control command sequences may be discovered through manual enumeration. For example, the printer driver associated with the printer model can be used to identify the base/installable capabilities. In particular, the user creates sample print jobs (one per capability) and saves the results. An examination is then made on the results to identify the print job control command sequence associated with each capability setting. The user then hand enters the capabilities/settings and print job control command sequences into the PMDB. While this technique is currently available, a variety of problems exist. For example, manual selection of print option/settings is prone to human error (e.g., incomplete, wrong combination), interpretation of test results for print job control command sequences is prone to human error, manual entry of information into the PMDB is prone to human error, and/or the manual task has proven to be laborious.

Thus, while techniques currently exist that are used to create a printer model database, challenges still exist. Accordingly, it would be an improvement in the art to augment or even replace current techniques with other techniques.

SUMMARY OF THE INVENTION

The present invention relates to electronic imaging environments. In particular, the present invention relates to systems and methods for dynamically generating a printer model database (PMDB) that is based on a printer driver, wherein the printer model database includes information about a printer model. Utilization of the printer model database enables a variety of processes to occur, including causing a print job to be compatible with a printing device when the print job is rerouted in a pool printing environment.

Implementation of the present invention takes place in association with a computer device for the dynamic generation of a printer model database. In accordance with at least some implementations of the present invention, a printer model database is dynamically generated by automatically generating device independent print job options, semi-automatically generating device dependent print job options, and automatically generating a printer model database.

As provided above, device independent print job options are automatically generated. In at least some implementations, a PMDB application automatically generates test cases (print jobs) by specifying device independent print options directly to a printer driver. The generated print jobs are captured downstream (e.g., at a print processor) and saved in a test archive. The print job options are permutated to identify exact print job control command (e.g., PJL, PCL) sequence differences from base cases.

As also provided above, device dependent print job options are semi-automatically generated. In at least some implementations, a user interacts with a PMDB generation application and a printer driver is invoked via the PMDB generation application. The user permutes each option and setting available to the printer driver. For each permutation, the user enters into the PMDB generation application the option/setting pair, which then generates a test print job. The generated print job is then captured downstream (e.g., print processor) and saved in a test archive. The PMDB generation application records the option/setting permutations to identify exact print job control command (e.g., PJL, PCL) sequence differences from base cases.

As also provided above, the PMDB is auto-generated. In at least some implementations, the PMDB generation application provides an entry into the PMDB for the printer driver. The entry includes information relating to (i) the associated printer model, (ii) any attribute information entered by the user (e.g., ppm), (iii) supported capabilities recorded while generating test print jobs from the printer driver, and (iv) supported settings per capability recorded while generating test print jobs from the printer driver. The PMDB generation application enters into the PMDB the print job control sequence per option/setting based on the analysis of the test archive.

While the methods and processes of the present invention have proven to be particularly useful in the area of dynamically generating a printer model database that enables a print job to be compatible with a printing device when the print job is rerouted in a pool printing environment, those skilled in the art can appreciate that the methods and processes can be used in association with a variety of different applications.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to electronic imaging environments. In particular, the present invention relates to systems and methods for dynamically generating a printer model database (PMDB) that is based on a printer driver, wherein the printer model database includes information about a printer model. Utilization of the printer model database enables a variety of processes to occur, including causing a print job to be compatible with a printing device when the print job is rerouted in a pool printing environment.

Embodiments of the present invention include a computer device for use in dynamic generation of a printer model database. In at least some embodiments of the present invention, a printer model database is dynamically generated by automatically generating device independent print job options, semi-automatically generating device dependent print job options, and automatically generating a printer model database.

In the disclosure and in the claims the term "imaging device" shall refer to a device that receives or transmits an imaging job, such as a multi-functional peripheral (MFP), a computing device, printer, scanner, facsimile device, etc. In the disclosure and in the claims the term "client computing device" or "client" shall refer to a computing device that constructs and despools an imaging job to either an imaging device or server. In the disclosure and in the claims the term "server computing device" shall refer to a computing device that manages an imaging device, receives imaging jobs and despools the imaging job to/from an imaging device.

While reference shall be made to a print job and printing devices, those skilled in the art will appreciate that embodiments of the present invention also includes other imaging devices that may be driven by an imaging device specific driver, such as scanning, faxing, document management, etc. Further, while reference will be made as to embodiments that include implementation in a Microsoft Windows® operating system, those skilled in the art will appreciate that other embodiments include implementation in other operating system environments.

The following disclosure of the present invention is grouped into two subheadings, namely "Exemplary Operating Environment" and "Dynamically Generating a Printer Model Database." The utilization of the subheadings is for convenience of the reader only and is not to be construed as limiting in any sense.

Exemplary Operating Environment

Figure 1:
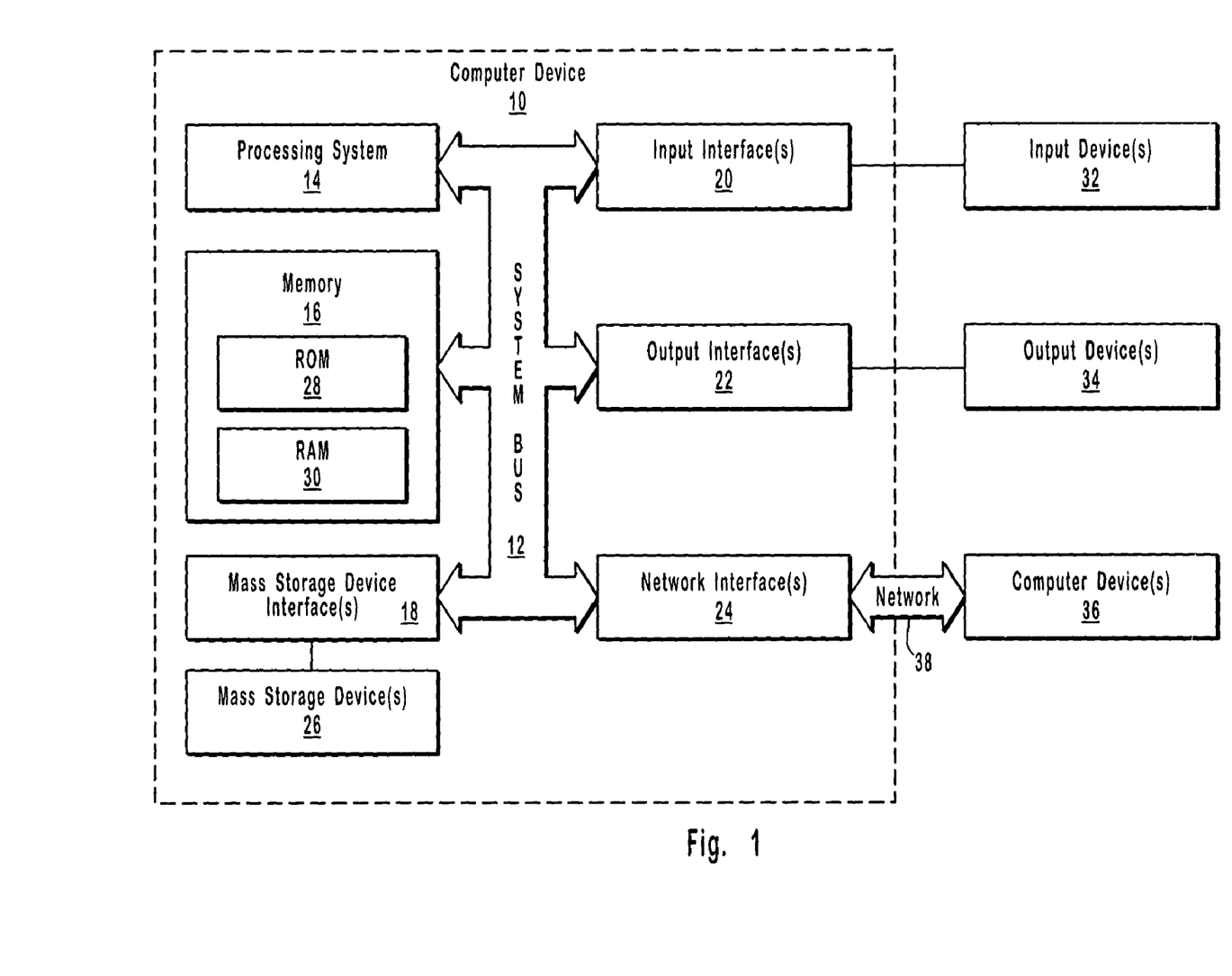
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention include one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices. Those skilled in the art will appreciate that embodiments of the present invention may be practiced in a variety of different environments with many types of computer system configurations. At least one embodiment includes a computer based imaging system, such as for printing, scanning and/or faxing, that includes one or more printer drivers, a special application for initiating print jobs through the printer drivers, a process downstream from the printer drivers to capture the print jobs, and a special application for analyzing the print jobs to determine information about the printer model associated with the printer driver to create an entry in a printer model database (PMDB).

Figure 2:
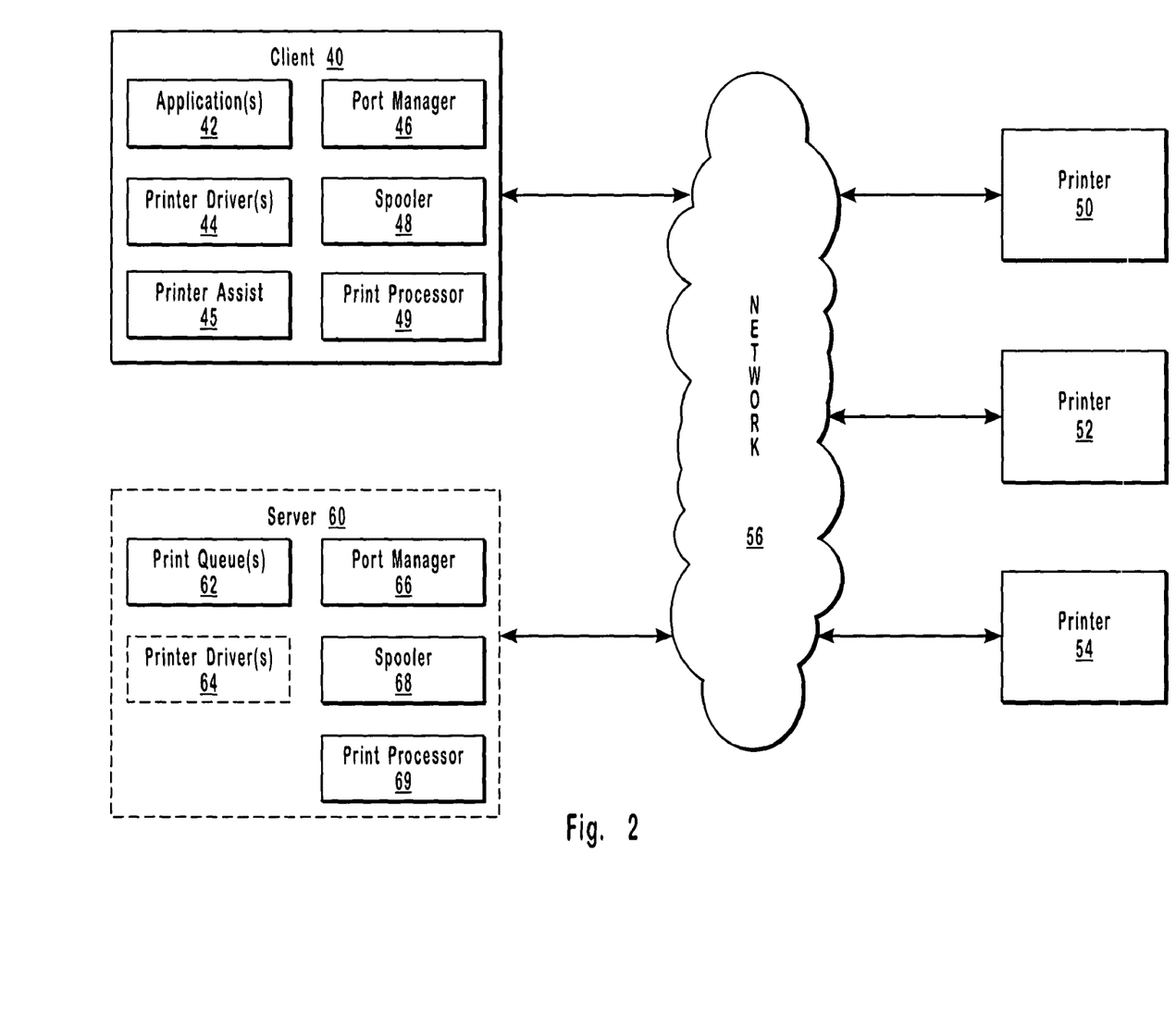
FIG. 2 illustrates a representative networked system configuration for use in association with the present invention.

With reference now to FIG. 2, a representative networked system configuration is illustrated that may be used in association with the present invention. While FIG. 2 illustrates an embodiment that includes a client, three printers, and optionally a print server connected to a network, alternative embodiments include more than one client, less than three printers, more than three printers, no server, and/or more than one server connected to a network. Other embodiments of the present invention include local, networked, or peer-peer printing environments where one or more computer devices are connected to one or more printing devices. Moreover, embodiments in accordance with the present invention also include wireless networked environments, or where the network is a wide area network, such as the Internet.

The representative system of FIG. 2 includes a computer device, illustrated as client 40, which is connected to a plurality of printing devices (printers 50-54) across network 56. In FIG. 2, printers 50-54 may be any type of device that may be used to render a print job. Examples of such devices included printers, fax machines, multi-functional peripheral (MFP) devices, or other types of printing/imaging devices. In one embodiment, the capabilities or image language interpretation of any one of the printers are heterogeneous to the capabilities or image language interpretation of any other printer (e.g., at least one of the capabilities or command codes of one printing device, such as printer 50, are different from the capabilities of another printing device, such as printer 52). In another embodiment, the capabilities or image language interpretation of the printers are homogeneous.

While printers 50-54 are connected to network 56, embodiments of the present invention include the use of printing/imaging devices that are locally connected to a computer device, that are configured in a peer-to-peer printing environment, or that are configured in a wireless network environment. Further, the printing devices may be one or more multi-function peripherals (MFPs), facsimile devices, scanning devices, electronic whiteboards, etc.

In the illustrated embodiment, client 40 includes software application(s) 42, one or more print drivers 44, a print assist 45, a port manager 46, a spooler 48, and a print processor 49. Other embodiments include configurations without a print assist. A printer server 60 is optionally included having, for example, one or more print queues 62, one or more printer drivers 64, a port manager 66, a spooler 68, and a print processor 69.

Thus, in accordance with the illustrated embodiment and other embodiments of the present invention, a printer model database (PMDB) that includes information about a printer model and is based on a printer driver is dynamically generated for utilization in an imaging environment, as will be further explained below.

Dynamically Generating a Printer Model Database

As provided above, the present invention relates to electronic imaging environments. In particular, the present invention relates to systems and methods for dynamically generating a printer model database (PMDB) that is based on a printer driver, wherein the printer model database includes information about a printer model.

Embodiments of the present invention include a computer device for use in dynamic generation of a printer model database. In at least some embodiments of the present invention, a printer model database is dynamically generated by automatically generating device independent print job options, semi-automatically generating device dependent print job options, and automatically generating a printer model database.

As provided above, device independent print job options are automatically generated. In at least some embodiments, a PMDB application automatically generates testcases (print jobs) by specifying device independent print options directly to a printer driver. The generated print jobs are captured downstream (e.g., at a print processor) and saved in a test archive. The print job options are permutated to identify exact print job control command (e.g., PJL, PCL, PostScript, ESCP) sequence differences from base cases.

As also provided above, device dependent print job options are semi-automatically generated. In at least some embodiments, a user interacts with a PMDB generation application and a printer driver is invoked via the PMDB generation application. The user permutes each option and setting available to the printer driver. For each permutation, the user enters into the PMDB generation application the option/setting pair, which then generates a test print job. The generated print job is then captured downstream (e.g., print processor) and saved in a test archive. The PMDB generation application records the option/setting permutations to identify exact print job control command (e.g., PJL) sequence differences from base cases.

As also provided above, the PMDB is auto-generated. In at least some embodiments, the PMDB generation application provides an entry into the PMDB for the printer driver. The entry includes information relating to (i) the associated printer model, (ii) any attribute information entered by the user (e.g., ppm), (iii) supported capabilities recorded while generating test print jobs from the printer driver, and (iv) supported settings per capability recorded while generating test print jobs from the printer driver. The PMDB generation application enters into the PMDB the print job control sequence per option/setting based on the analysis of the test archive.

In accordance with at least some embodiments of the present invention, a user creates PMDB entries for one or more printer models. For each printer model, the user installs the printer driver associated with the printer model on a computing device. On the computing device, the user installs an application and a post-spooling process downstream from the printer driver in the print subsystem, which assists in the generation of the PMDB entries.

The PMDB generation application is used to exercise the printer driver to generate a sequence of test print jobs that includes one or more base sequences and one or more sequences per option/setting supported by the printer driver. The PMDB generation post-spooling process is used to capture the test print jobs and subsequently archive the results with the associated sequence information used to exercise the printer driver. (By way of example, the PMDB post-spooling process may include a print processor, such as in the Microsoft Windows® family of operating systems.)

Figure 3:
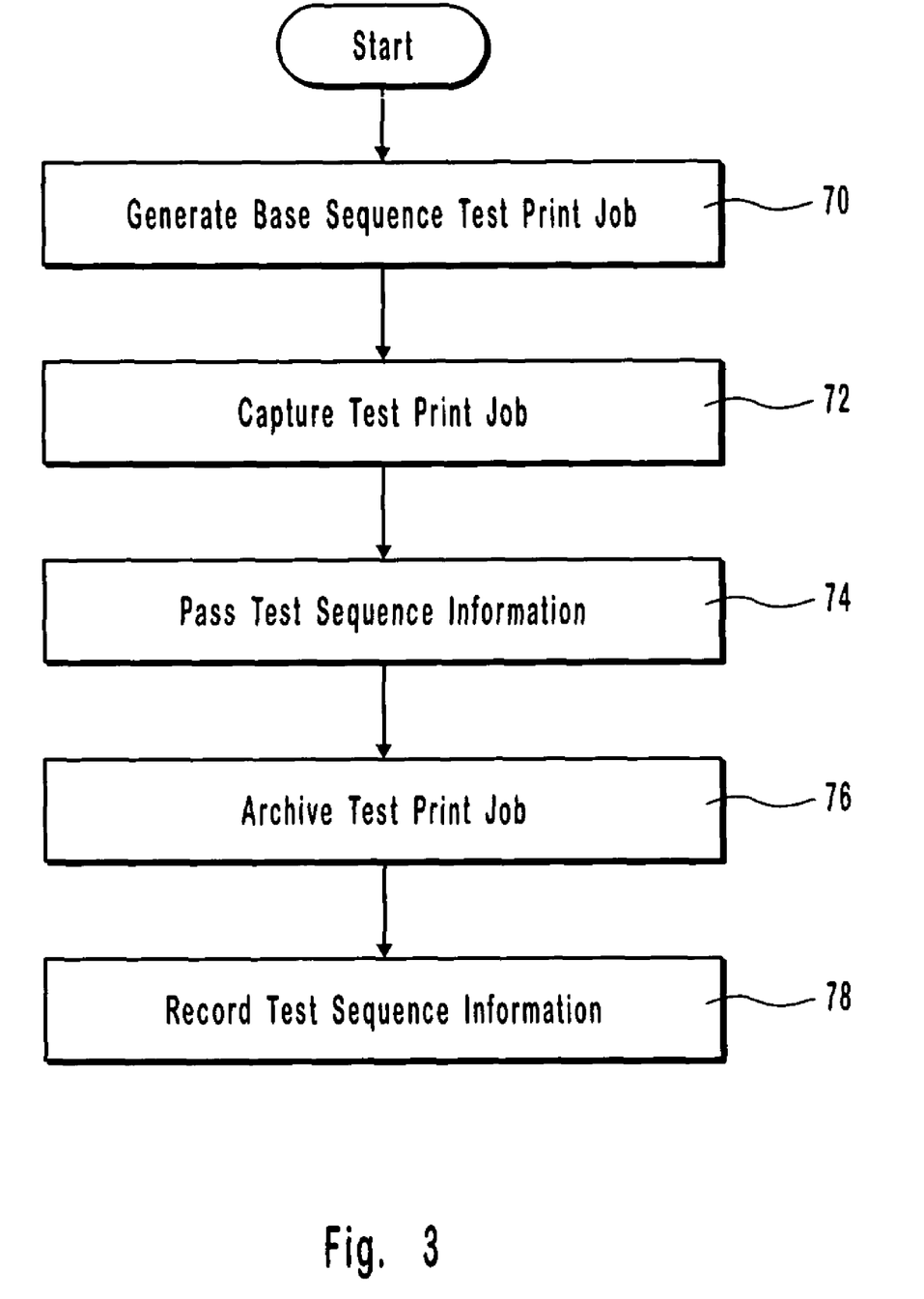
FIG. 3 illustrates a flow chart that provides a representative embodiment for dynamically generating a printer model database.

With reference now to FIG. 3, a flow chart is illustrated that provides a representative embodiment for dynamically generating a printer model database. In FIG. 3, the PMDB generation application first generates one or more base sequence test jobs at step 70. For example, the PMDB generation application may invoke the printer driver to generate a print job without specifying any print options. This job can then later be used as a template when analyzing subsequent test print jobs. In another embodiment, the PMDB generation application may repeat the same print job to identify transient print job control command settings (e.g., date and time).

For each test print job generated, the test print job is captured at step 72 by the PMDB generation post-spooling process. The post-spooling process may be implemented as, but not limited to, a print spooler, print processor, port manager, print server or print assist, wherein a print assist is any custom process added between the printer driver and port manager.

At step 74, the PMDB generation application communicates with the PMDB generation post-spooling process to pass test sequence information associated with the test print job from the application to the post-spooling process. For example, the application passes the print option/settings specified and may pass other additional information. The PMDB generation post-spooling process archives the test print job at step 76 and records test sequence information obtained from the PMDB generation application with the test print job at step 78.

Figure 4:
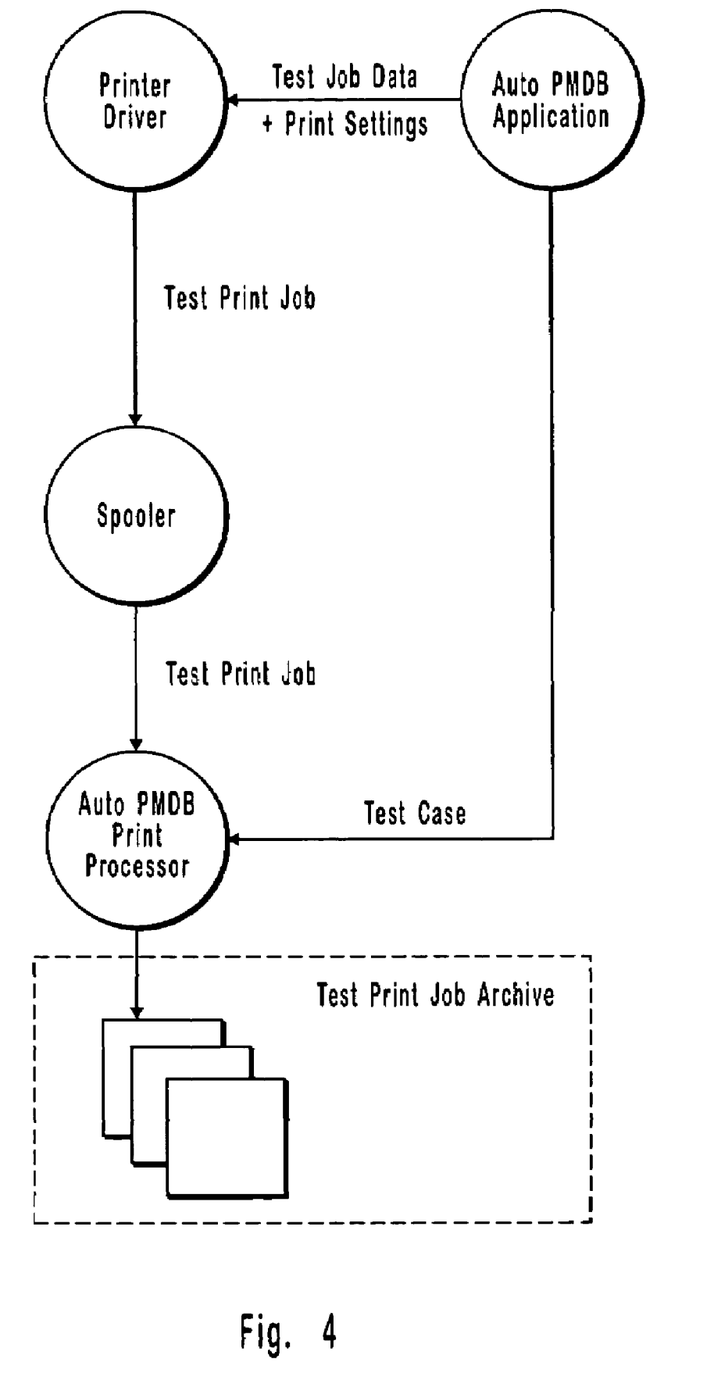
FIG. 4 illustrates a representative configuration for dynamic generation of a printer model database for a printer driver, wherein settings are independent of the printer driver.

With reference to FIG. 4, a representative configuration for dynamic generation of a printer model database for a printer driver is illustrated. Accordingly, FIG. 4 is a representative configuration for the embodiment illustrated in FIG. 3.

Figure 5:
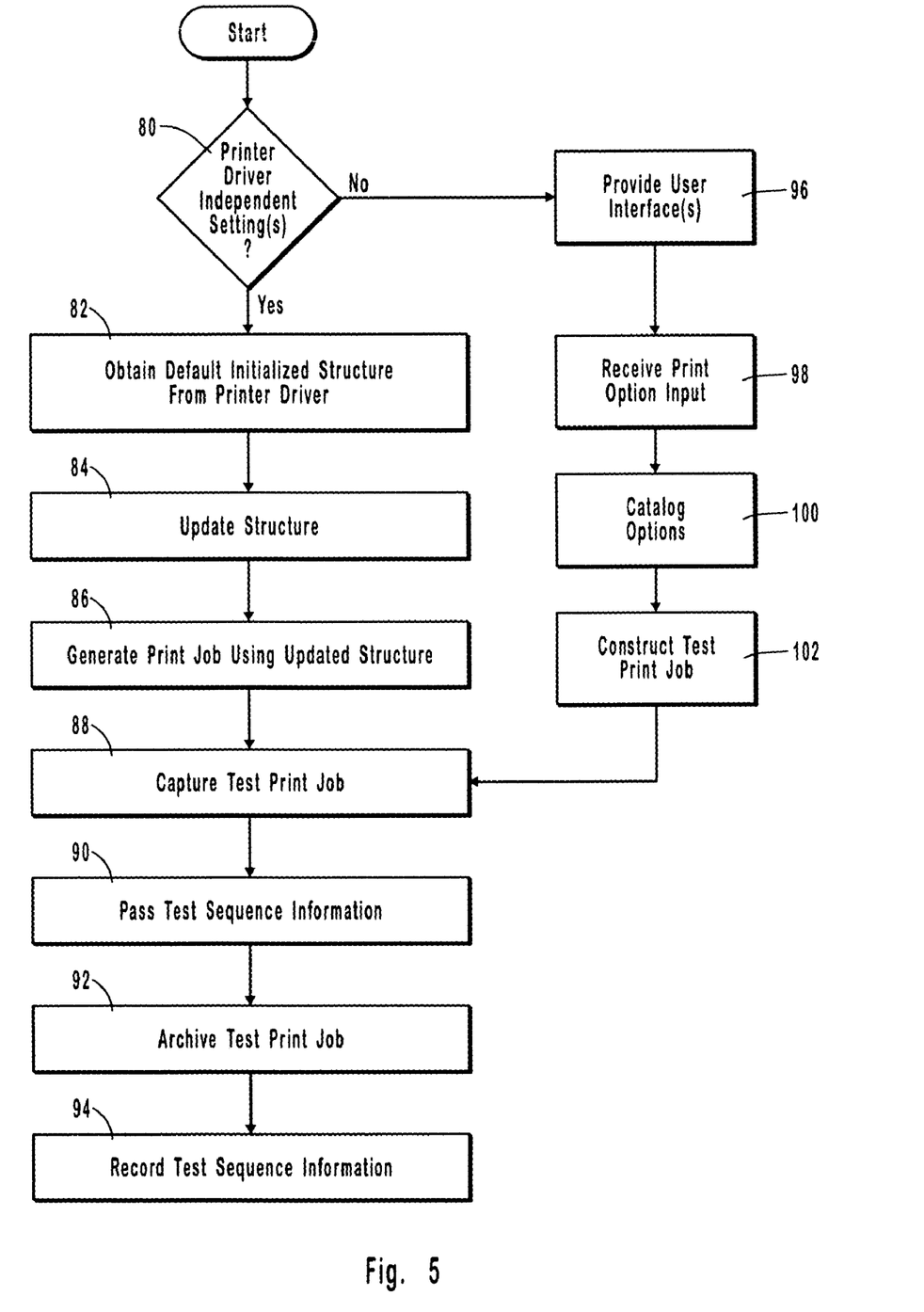
FIG. 5 illustrates a flow chart that provides representative processing for dynamically generating base sequences.

With reference now to FIG. 5, a flow chart is illustrated that provides representative processing for dynamically generating base sequence test print jobs, as referenced in FIG. 3 by step 70. In FIG. 5, a determination is made at decision block 80 as to whether or not the options/settings are printer driver independent. In accordance with at least some embodiments of the present invention, printer driver independent options are options that are standardized on a client's operating system and use a common mechanism across all drivers to be invoked. This is because the PMDB generation application is able to automatically generate test print jobs for each option/setting which is printer driver independent. Accordingly, if it is determined at decision block 80 that the options/settings are printer driver independent, execution proceeds to step 82.

At step 82, a default initialized structure is obtained from a printer driver. In the Microsoft Windows® family of operating systems, an application passes the print job option/settings to a printer driver through a DEVMODE structure. This data structure includes two parts: (i) a section for option/settings that are standardized on the operating system to all printer drivers; and (ii) a section for option/settings that are proprietary to the printer driver. When the settings are independent of the printer driver, the PMDB generation application automatically fills in the DEVMODE structure without manual assistance from a user or the printer driver's print menu. Examples of option/settings that are standardized or independent of a printer driver include: (i) the number of copies; (ii) copy collation; (iii) duplex printing; (iv) page order (e.g., reverse vs. normal); (v) page orientation (e.g., portrait vs. landscape); (vi) booklet and N-up printing (e.g., Windows® 2000/XP); (vii) paper size; (viii) paper source; and (ix) paper type.

Thus, for each option/setting that is printer driver independent, the PMDB generation application obtains a default initialized DEVMODE structure from the corresponding printer driver at step 82, updates the DEVMODE structure according to the option/setting under test at step 84 and generates a print job using the updated DEVMODE structure at step 86.

For each test print job generated, the test print job is captured by the PMDB generation post-spooling process at step 88. The PMDB generation application communicates with the PMDB generation post-spooling process to pass test sequence information associated with the test print job from the application to the post-spooling process at step 90. The PMDB generation post-spooling process then archives the test print job at step 92 and records test sequence information obtained from the PMDB generation application with the test print job at step 94.

With reference back to FIG. 4, a representative configuration is illustrated for printer driver independent options/settings.

Embodiments of the present invention include the PMDB generation application semi-automatically generating test print jobs for each option/setting that is printer driver dependent. Thus, with reference back to decision block 80 of FIG. 5, if it is determined that the option/setting is not printer driver independent, execution proceeds to step 96.

The user interacts with the PMDB generation application via a dialog interface and the printer driver through the printer driver's print menu interface. Accordingly, the user interface(s) are provided at step 96. The PMDB generation application sends a command to the printer driver to display to the user its printer driver specific print menu. In a Microsoft Windows® environment, these are the printer driver's property pages (e.g., selecting the properties button in the File →Print menu). At step 98, the user is then instructed to identify and input into the PMDB generation application each print option on the printer driver's print menu.

Once all the options are cataloged at step 100, the PMDB generation application constructs test print jobs at step 102. The test print jobs are constructed in two phases: (i) a first phase for proprietary settings to standardized options (e.g., printer driver independent options); and (ii) a second phase for proprietary options.

Figure 6:
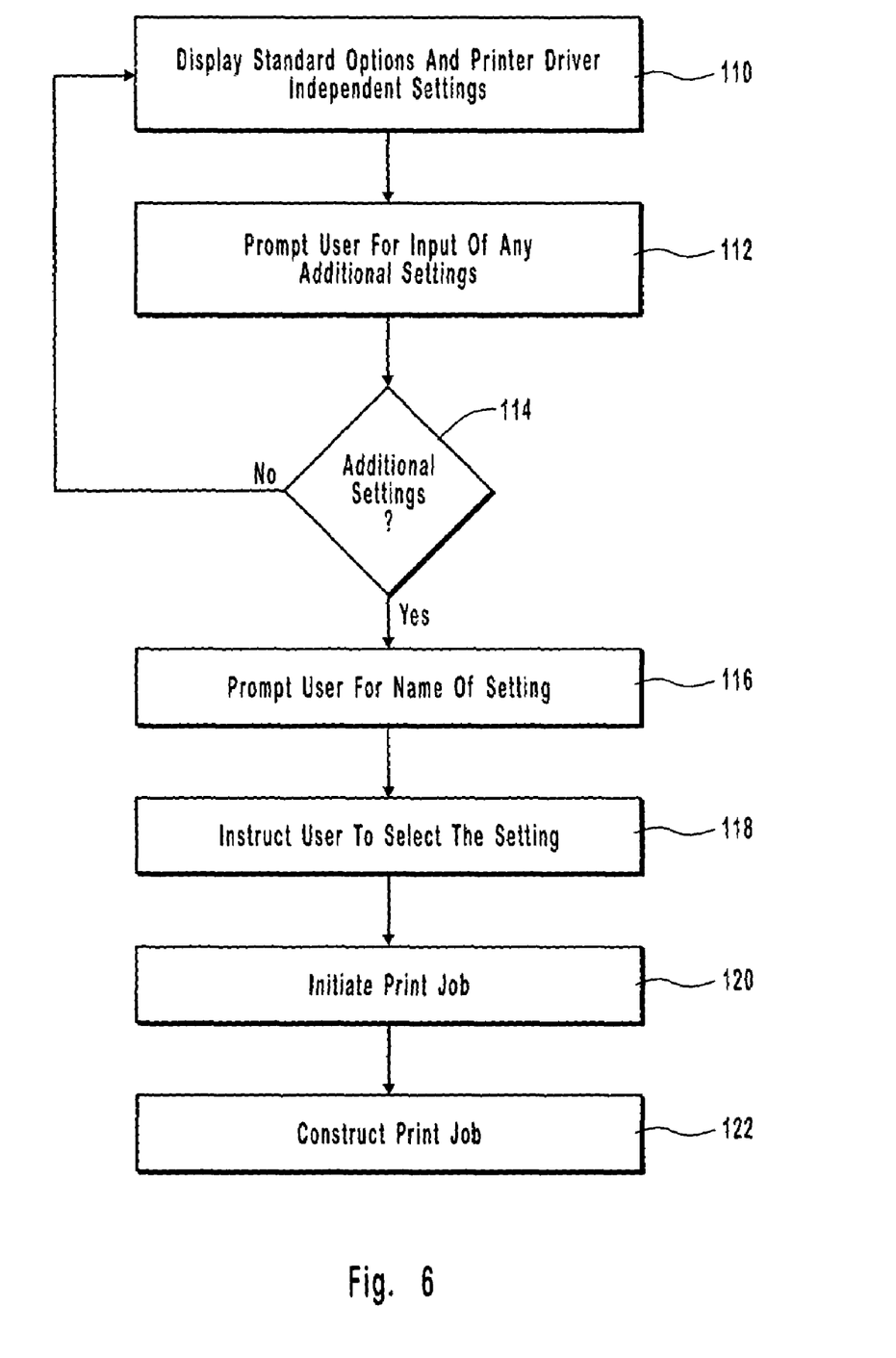
FIG. 6 illustrates a flow chart that provides representative processing relating to a first phase for constructing test print jobs.

With reference now to FIG. 6, a representative embodiment corresponding to the first phase is illustrated. In FIG. 6, the PMDB generation application displays, one at a time, each standard option along with the printer driver independent settings at step 110. At step 112, the user is then prompted to enter any additional settings available in the printer driver but not in the list. A determination is then made at decision block 114 as to whether or not there are additional settings. If it is determined that there are none, the PMDB generation application continues to the next standardized option.

Alternatively, if it is determined that there are additional settings, the PMDB generation application performs the following process for each additional setting: The user is prompted for the name of the setting at step 116, is instructed to select the setting at step 118, is instructed to select the "OK" button in the print menu to initiate the print job at step 120, and a print job is constructed via the printer driver with the current print job option/setting at step 122.

With reference back to FIG. 5, once the test print job is constructed at step 102, each test print job is captured by the PMDB generation post-spooling process at step 88. The test sequence information is then passed at step 90, the test print job is archived at step 92, and the test sequence information is recorded at step 94.

Figure 7:
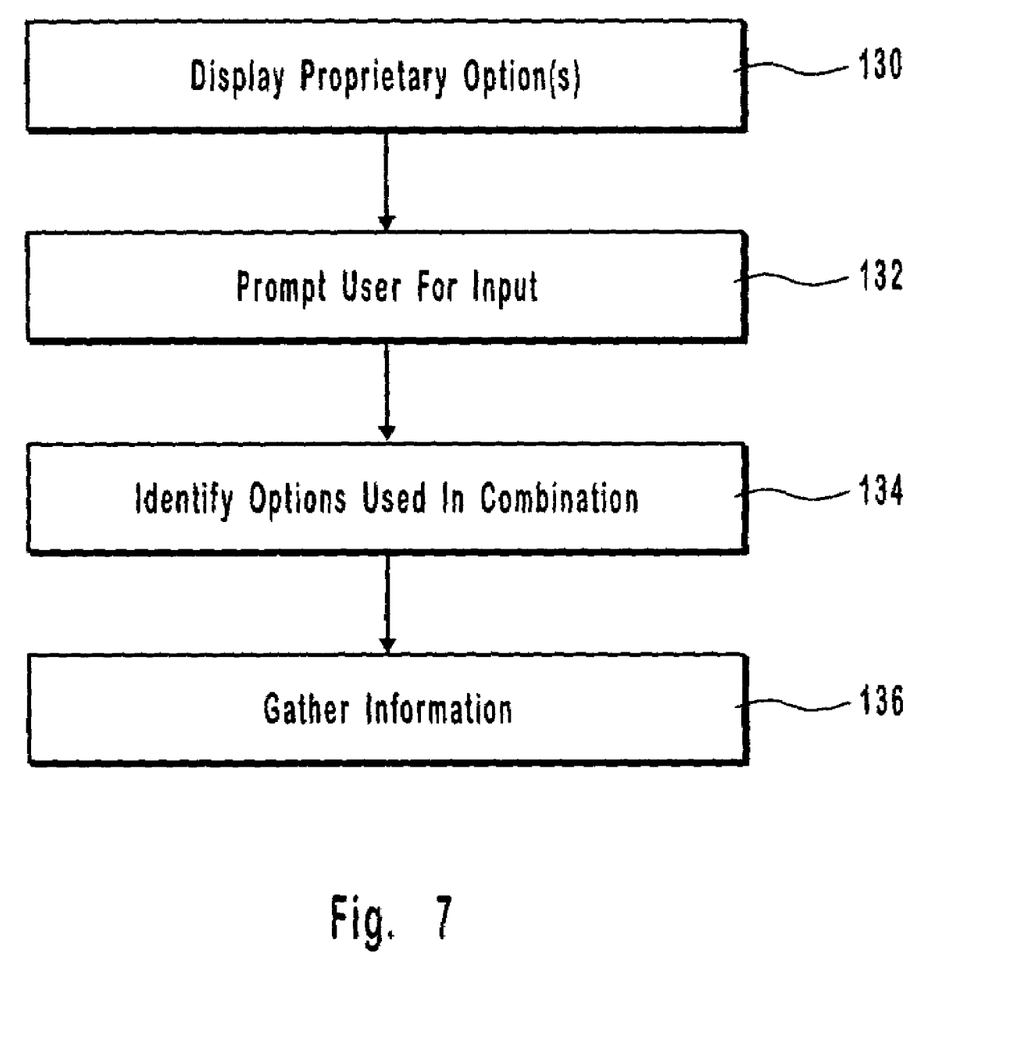
FIG. 7 illustrates a flow chart that provides representative processing relating to a second phase for constructing test print jobs.

With respect to the second phase of constructing test print jobs, reference is now made to FIG. 7. At step 130, the PMDB generation application displays each proprietary option, one at a time. At step 132, the user is prompted to identify and enter the data entry type of the option. Examples of data entry type include a predefined list of entries, a variable data entry (e.g., integer value), etc. At step 134, the PMDB generation application asks the user to identify any options that are used in combination (e.g., entered together). For example, an account code may require a user to enter both a user identification in one option/field and a department identification in another option/field. The PMDB generation application may also ask the user if the option is a base option (e.g., standard with the device) or an installable option. Once all of the information has been gathered at step 136, the PMDB generation application performs the previously described process for each option/setting.

Figure 8:
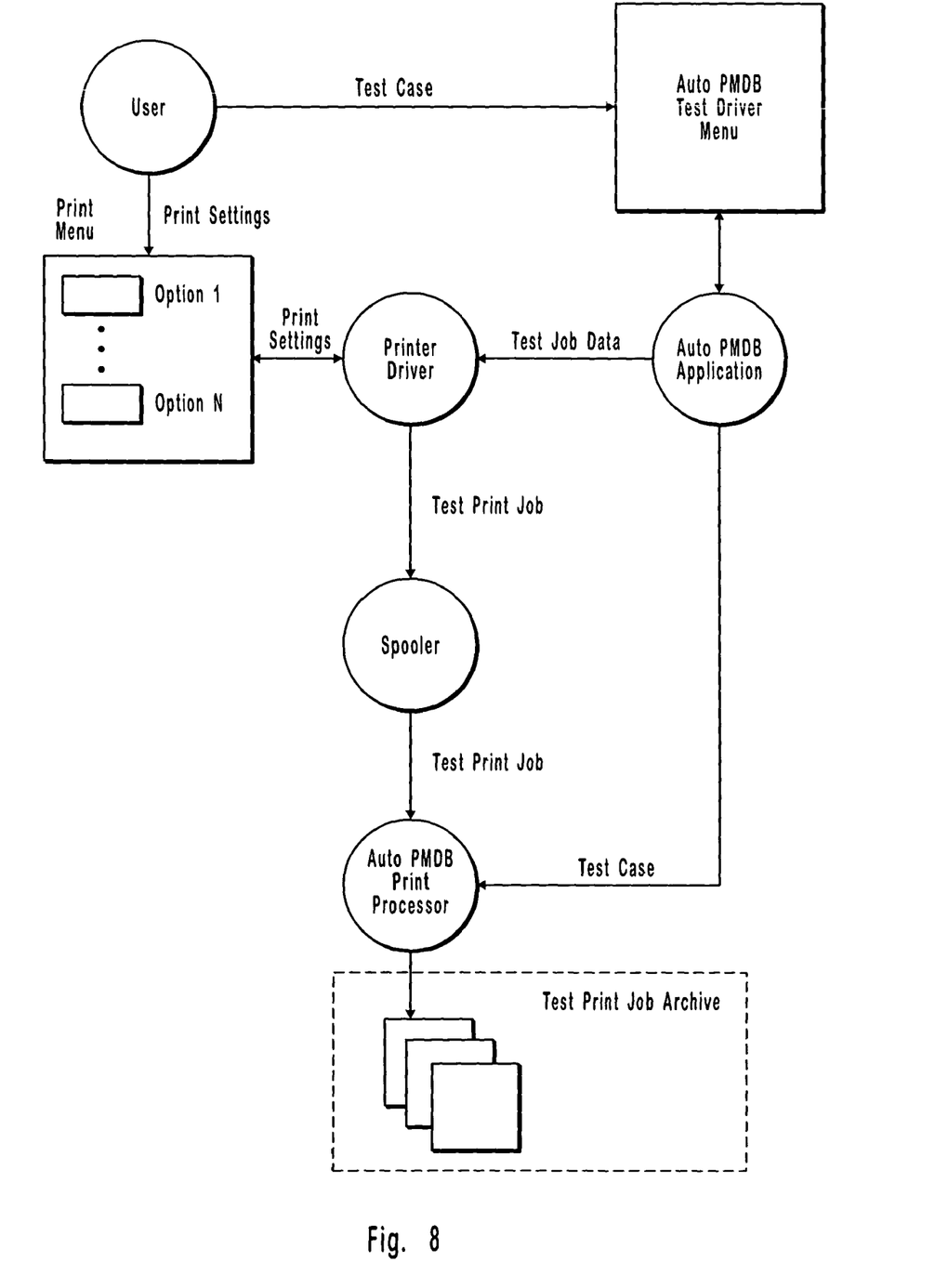
FIG. 8 illustrates a representative configuration for dynamic generation of a printer model database for a printer driver, wherein settings are dependent of the printer driver.
Figure 9:
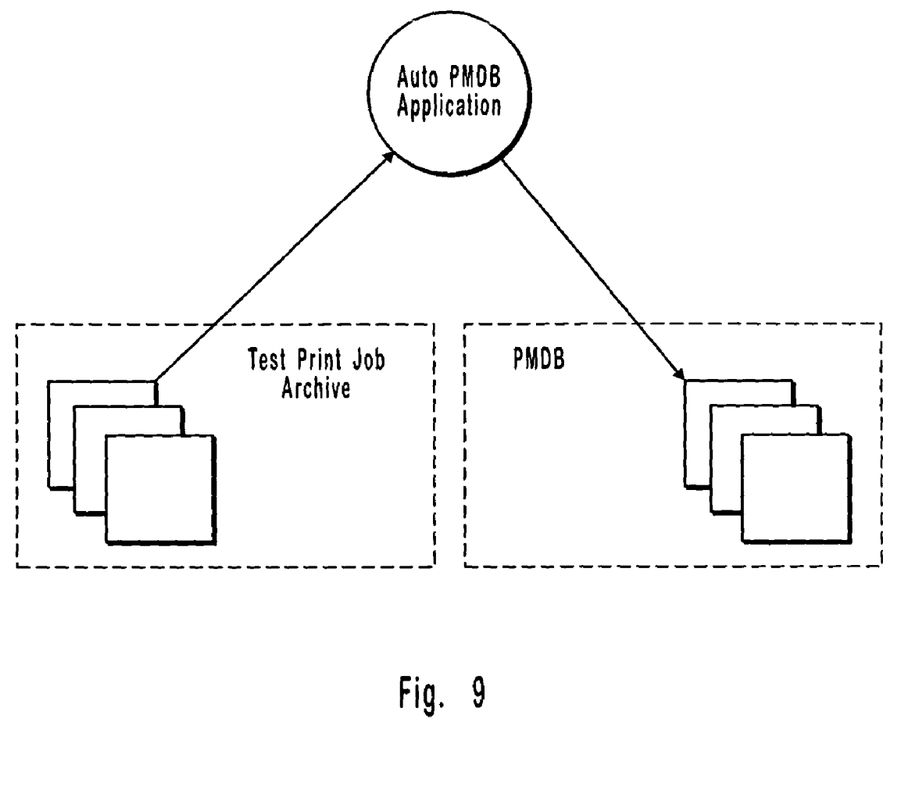
FIG. 9 illustrates a representative configuration for test print job analysis.

With reference now to FIG. 8, a representative configuration is provided for dynamic generation of a printer model database, wherein settings/options are dependent of the printer driver; and With reference now to FIG. 9, a representative configuration for test print job analysis is illustrated. In accordance with at least some embodiments of the present invention, after the test print jobs have been generated and archived, the PMDB generation application performs an analysis of the test archive for the purpose of generating a PMDB entry for the corresponding printer model.

The PMDB generation application performs the analysis by comparing test print jobs against base sequence print jobs to identify any differences. In a first phase of comparisons, the PMDB generation application attempts to identify the print job control commands that are not generated as a result of a print option/setting selection. For example, the print job control sequence in the print job may include information about the origination of the print job, such as the document name, computing device name and network address, user name, etc.

The PMDB compares the base sequence test print jobs against each other and other test print jobs to identify and filter the print job control commands that are not set as a result of a print option/setting. This process may also use other methods in conjunction, such as pre-existing knowledge of common print job control commands or assistance from the user via dialog prompts.

In a second phase, where the recorded information is used, the PMDB compares one or more test print jobs against one or more test print jobs to determine which print job control statements are associated with each print option/setting. Generally, the comparison tests for differences between the test print jobs. For example, the PMDB generation application compares a test print job with another test print job, where both test print jobs set a different option, to identify the statements associated with a print option. The differing print job commands constitute the candidate print job command list. Another difference test may then be performed with yet another test print job of a different option to identify the print job commands that are associated with the print option.

Once the print job control commands are identified per option, the PMDB generation application compares each test print job for a print option to determine the arguments per setting. Once the analysis is complete, the PMDB generation application updates the PMDB for the respective printer model. This information may include, for example, a printer driver associated with the printer model, an attribute and other information entered by the user, an option/settings that is based on the printer driver's print menu, and/or a print job control command sequences per option/setting.

While embodiments include the spooling and despooling subsystems of the Microsoft Windows® family of operating systems, embodiments of the present invention also include other operating systems, such as the Apple MacIntosh® operating system, Linux® operating system, System V Unix® operating systems, BSD Unix® operating systems, OSF Unix® operating systems, Sun Solaris® operating systems, HP/UX operating systems, and IBM® Mainframe MVS operating system, IBM® AS/400 operating system, etc. Other embodiments include other imaging operations such as scanning, faxing and document management. Moreover, other embodiments for a PMDB generation post-spooling process include an enhanced print spooler, a custom port manager and a print assist, where a print assist is any custom component added to the print subsystem between the printer driver and port manager.

Thus, as discussed herein, embodiments of the present invention include electronic imaging environments. In particular, the present invention relates to systems and methods for dynamically generating a printer model database (PMDB) that is based on a printer driver, wherein the printer model database includes information about a printer model.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for dynamically generating a printer model database through print job analysis, the method comprising:
   using a printer model database generation application to dynamically generate a plurality of test print jobs for delivery to a first printer driver;
   using a printer model database generation post-spooling process to capture the test print jobs as output by the first printer driver;
   exchanging test sequence information between the printer model database generation application and the printer model database generation post-spooling process, wherein the test sequence information is associated with the plurality of test print jobs;
   archiving the test print jobs; and
   using the printer model database generation application to perform an analysis process comparing differences between the plurality of test print jobs as output by the first printer driver to generate a printer model database entry for the first printer driver.

2. The method as recited in claim 1, wherein using a printer model database generation application to dynamically generate a plurality of test print jobs comprises automatically generating a first test print job when the first test print job corresponds to an option that is printer driver independent.

3. The method as recited in claim 2, wherein automatically generating the first test print job when the first test print job corresponds to an option that is printer driver independent comprises at least one of:
   (i) specifying one or more device independent print options
   (ii) specifying one or more device independent option settings.

4. The method as recited in claim 2, wherein the option corresponds to at least one of:
   (i) a number of copies to be rendered;
   (ii) a copy collation process;
   (iii) a duplex printing process;
   (iv) an order for rendering pages of the print job;
   (v) an orientation for rendering a page of the print job;
   (vi) a size of paper to be used to render the print job;
   (vii) a paper source to be used to render the print job;
   (viii) a paper type to be used to render the print job;
   (ix) a booklet rendering process; and
   (x) an N-up printing process.

5. A method as recited in claim 2, further comprising:
   obtaining a default initialized structure from a printer driver;
   updating the structure according to the option; and
   generating the first test print job using the updated structure.

6. The method as recited in claim 1, wherein using a printer model database generation application to dynamically generate a plurality of test print jobs comprises semi-automatically generating a first test print job when the first test print job corresponds to at least one of:
   (i) an option that is printer driver dependent; and
   (ii) an option setting that is printer driver dependent.

7. A method as recited in claim 6, wherein semi-automatically generating the first test print job comprises using the printer model database generation application to initiate user interaction.

8. A method as recited in claim 7, wherein semi-automatically generating the first test print job further comprises:
   receiving user input relating to at least one of (i) the option and (ii) the option setting;
   cataloging at least one of (i) the option and (ii) the option setting; and
   electronically constructing the first test print job.

9. A method as recited in claim 8, wherein electronically constructing the first test print job comprises:

displaying any standard options and printer driver independent settings;
obtaining from the user any input relating to additional settings; and
initiating the first test print job.

10. A method as recited in claim 8, wherein electronically constructing the first test print job comprises:
prompting the user for any proprietary options; and
obtaining from the user any input relating to the proprietary options.

11. A method as recited in claim 1, wherein using a printer model generation post-spooling process to capture the test print jobs as output by the first printer driver is performed by at least one of:
(i) a print processor;
(ii) a print spooler;
(iii) a port monitor;
(iv) a print assist; and
(v) a print server.

12. A system configured to dynamically generating a printer model database through print job analysis, the system comprising:
a computer device comprising:
a processing system;
a print subsystem;
a printer model database generation application configured to dynamically generate a plurality of test print jobs, to send the plurality of test print jobs to a first printer driver, and to perform an analysis process to compare differences between the plurality of generated test print jobs sent to the first printer driver to generate a printer model database entry for the first printer driver; and configured to dynamically generate a plurality of test print jobs, to send the plurality of test print jobs to a first printer driver, and to perform an analysis process to generate a printer model database entry based on differences between the plurality of generated test print jobs sent to the first printer driver; and
a printer model database generation post-spooling process configured to capture the plurality of test print jobs as output by the first printer driver; and
a printer device configured to render a print job; and
a communication mechanism coupled to the computer device and to the printer device.

13. The system method as recited in claim 12, wherein the print subsystem comprises at least one of:
(i) a printer driver;
(ii) a print assist;
(iii) a spooler; and
(iv) a print processor.

14. The system as recited in claim 13, wherein the printer model database generation application is configured to automatically generate a first test print job when the first test print job corresponds to a printer driver independent option and to semi-automatically generate a second test print job when the second test print job corresponds to at least one of (i) a printer driver dependent option and (ii) a printer driver dependent option setting.

15. The system as recited in claim 13, wherein the printer model generation post-spooling process is performed by at least one of:
(i) the print processor;
(ii) the printer driver;
(iii) the print assist;
(iv) the spooler; and (v) a print server coupled to the communication mechanism, wherein the communication mechanism is a network.

16. A computer readable medium storing computer program code means utilized to implement a method for dynamically generating a printer model database through print job analysis, wherein the computer program code means is comprised of executable code for implementing:
using a printer model database generation application to dynamically generate a plurality of test print jobs for delivery to a first printer device;
using a printer model database generation post-spooling process to capture the test print jobs as output by the first printer device;
exchanging test sequence information between the printer model database generation application and the printer model database generation post-spooling process, wherein the test sequence information is associated with the plurality of test print jobs;
archiving the test print jobs; and
using the printer model database generation application to perform an analysis process comparing differences between the plurality of test print jobs as output by the first printer driver to generate a printer model database entry for the first printer driver.

17. A computer readable medium as recited in claim 16, wherein using a printer model database generation application to dynamically generate the plurality of test print jobs comprises automatically generating a first test print job when the first test print job corresponds to an option that is printer driver independent.

18. A computer readable medium as recited in claim 17, wherein the computer program code means further comprises executable code for implementing:
obtaining a default initialized structure from a printer driver;
updating the structure according to the option; and
generating the first test print job using the updated structure.

19. A computer readable medium as recited in claim 16, wherein using a printer model database generation application to dynamically generate the plurality of test print jobs comprises:
using the printer model database generation application to initiate user interaction;
receiving user input relating to at least one of (i) a printer driver dependent option and (ii) a printer driver dependant option setting;
cataloging at least one of (i) the printer driver dependent option and (ii) the printer driver dependent option setting; and
electronically constructing a first test print job.

20. A computer readable medium as recited in claim 16, wherein the computer program code means further comprises executable code for implementing employing a print component to perform using a printer model generation post-spooling process to capture the plurality of test print jobs, wherein the print component is one of:
(i) a print processor;
(ii) a printer driver;
(iii) a print assist;
(iv) a spooler; and
(v) a print server.

21. A method for determining an imaging device command, the method comprising:
generating a base sequence test print job;

capturing output information for the base sequence test print job from a first printer driver;

generating a command specific print job wherein one option is configured differently than in the base sequence test print job;

capturing driver output for the command specific print job from the first printer driver; and comparing the driver output for the command specific print job and the output information for the base sequence test print job to determine the imaging device command for communicating the one option.

22. A method for creating an imaging device command database, the method comprising:

generating a base sequence test imaging device job;

capturing output information for said base sequence test imaging device job from a first printer driver;

generating a command specific imaging device job wherein at least one option is configured differently than in said base sequence test imaging device job;

capturing command specific driver output for said command specific imaging device job from the first printer driver; and storing at least one difference between said output information and said command specific driver output as an imaging device command in an imaging device command database.

23. A method for dynamically generating a printer model database through print job analysis, the method comprising:

using a printer model database generation application to automatically and dynamically generate a base sequence test print job when the test print job corresponds to an option that is printer driver independent comprising:

obtaining a default initialized structure from a printer driver;

updating the structure according to the option; and generating the print job using the updated structure;

using a printer model database generation post-spooling process to capture the test print job;

exchanging test sequence information between the printer model database generation application and the printer model database generation post-spooling process, wherein the test sequence information is associated with the test print job;

archiving the test print job; and using the printer model database generation application to perform an analysis process to generate a printer model database entry.

24. A computer readable medium storing computer program code means utilized to implement a method for dynamically generating a printer model database through print job analysis, wherein the computer program code means is comprised of executable code for implementing:

using a printer model database generation application to automatically and dynamically generate a base sequence test print job when the test print job corresponds to an option that is printer driver independent comprising:

obtaining a default initialized structure from a printer driver;

updating the structure according to the option; and generating the print job using the updated structure;

using a printer model database generation post-spooling process to capture the test print job;

exchanging test sequence information between the printer model database generation application and the printer model database generation post-spooling process, wherein the test sequence information is associated with the test print job;

archiving the test print job; and using the printer model database generation application to perform an analysis process to generate a printer model database entry.

* * * * *